(12) United States Patent
Constantine

(10) Patent No.: US 8,683,734 B2
(45) Date of Patent: Apr. 1, 2014

(54) FISHING GAFF

(75) Inventor: Richard S. Constantine, Milford, CT (US)

(73) Assignee: Acme United Corporation, Fairfield, CT (US)

( * ) Notice: Subject to any disclaimer, the term of this patent is extended or adjusted under 35 U.S.C. 154(b) by 197 days.

(21) Appl. No.: 13/347,215

(22) Filed: Jan. 10, 2012

(65) Prior Publication Data

US 2012/0204468 A1    Aug. 16, 2012

Related U.S. Application Data

(60) Provisional application No. 61/443,291, filed on Feb. 16, 2011.

(51) Int. Cl.
*A01K 97/14* (2006.01)

(52) U.S. Cl.
USPC .............................................. 43/5

(58) Field of Classification Search
USPC .............................................. 43/5
See application file for complete search history.

(56) References Cited

U.S. PATENT DOCUMENTS

| | | | | |
|---|---|---|---|---|
| 2,598,230 A | * | 5/1952 | Dann | 294/26 |
| D229,051 S | * | 11/1973 | Bordenave | D22/149 |
| 4,169,330 A | * | 10/1979 | Schnur | 43/5 |
| 4,691,465 A | * | 9/1987 | Dooley | 43/5 |
| 4,739,573 A | * | 4/1988 | Robertson | 43/5 |
| 4,769,939 A | * | 9/1988 | Gonska et al. | 43/4 |
| 7,728,096 B2 | * | 6/2010 | Winterowd et al. | 528/44 |
| 7,896,414 B1 | * | 3/2011 | Brigham | 294/26 |
| 7,909,713 B2 | * | 3/2011 | Davis et al. | 473/561 |
| 7,931,839 B2 | * | 4/2011 | Davis et al. | 264/154 |
| 2004/0016170 A1 | * | 1/2004 | Fitzgibbons | 43/5 |

* cited by examiner

*Primary Examiner* — Christopher P Ellis
(74) *Attorney, Agent, or Firm* — Alix, Yale & Ristas, LLP

(57) ABSTRACT

A fishing gaff has a handle with an offset portion. A shaft extends longitudinally from the offset portion. Generally equidistantly spaced openings are formed in the shaft to facilitate movement through the water. A hook extends from the end of the shaft. Overmould material along portions of the handle provide offset grip segments to enhance leverage.

20 Claims, 4 Drawing Sheets

FISHING GAFF

CROSS REFERENCE TO RELATED APPLICATION

This application claims the priority of U.S. Provisional Patent Application No. 61/443,291 filed on Feb. 16, 2011, the disclosure of which is incorporated herein by reference in its entirety.

BACKGROUND

This disclosure relates generally to fishing gaffs. More particularly, this disclosure relates to fishing gaffs which employ a pole that mounts a sharp hook to engage into a fish and land the fish.

SUMMARY

Briefly stated, a fishing gaff has a handle with a tapered portion and having an intermediate compound bend. A shaft longitudinally extends from the handle. The shaft forms a plurality of longitudinally spaced transverse openings. A hook extends from the shaft. The openings preferably have a generally elliptical shape. The openings are also preferably equidistantly spaced and inwardly tapered. The shaft preferably has a generally elliptically shaped cross-section. An overmould material is affixed along at least a portion of the handle. The handle has two spaced offset portions.

The fishing gaff comprises a handle with a multi-bent configuration generally having a first linear segment, a second generally linear segment and a third generally linear segment. The second intermediate segment intersects the first segment and the third segment to define a compound bend. A shaft longitudinally extends from the third segment. The shaft defines a plurality of longitudinally spaced openings and a hook extends from the shaft. The openings are preferably equidistantly spaced. An overmould material covers at least a portion of the first segment and the third segment. The first segment and the third segment are disposed in offset relationship to facilitate usage of the gaff. The first segment preferably has a generally tapered configuration extending from a proximal end to a bend. In one embodiment there are seven shaft openings which each have a generally elliptical shape.

In one embodiment, the fishing gaff comprises a handle having a proximal grip segment and an offset grip segment with an intermediate compound bend. The shaft integrally longitudinally extends from the offset segment. The shaft has a plurality of longitudinally spaced openings. A hook extends from the shaft. The handle, the shaft and the hook define a common plane. The openings define corresponding passageways disposed generally orthogonally to the plane. The shaft openings preferably have a generally identical shape and dimension. The proximal grip segment and the offset grip segment each have an overmould covering.

DETAILED DESCRIPTION

Figure 1:
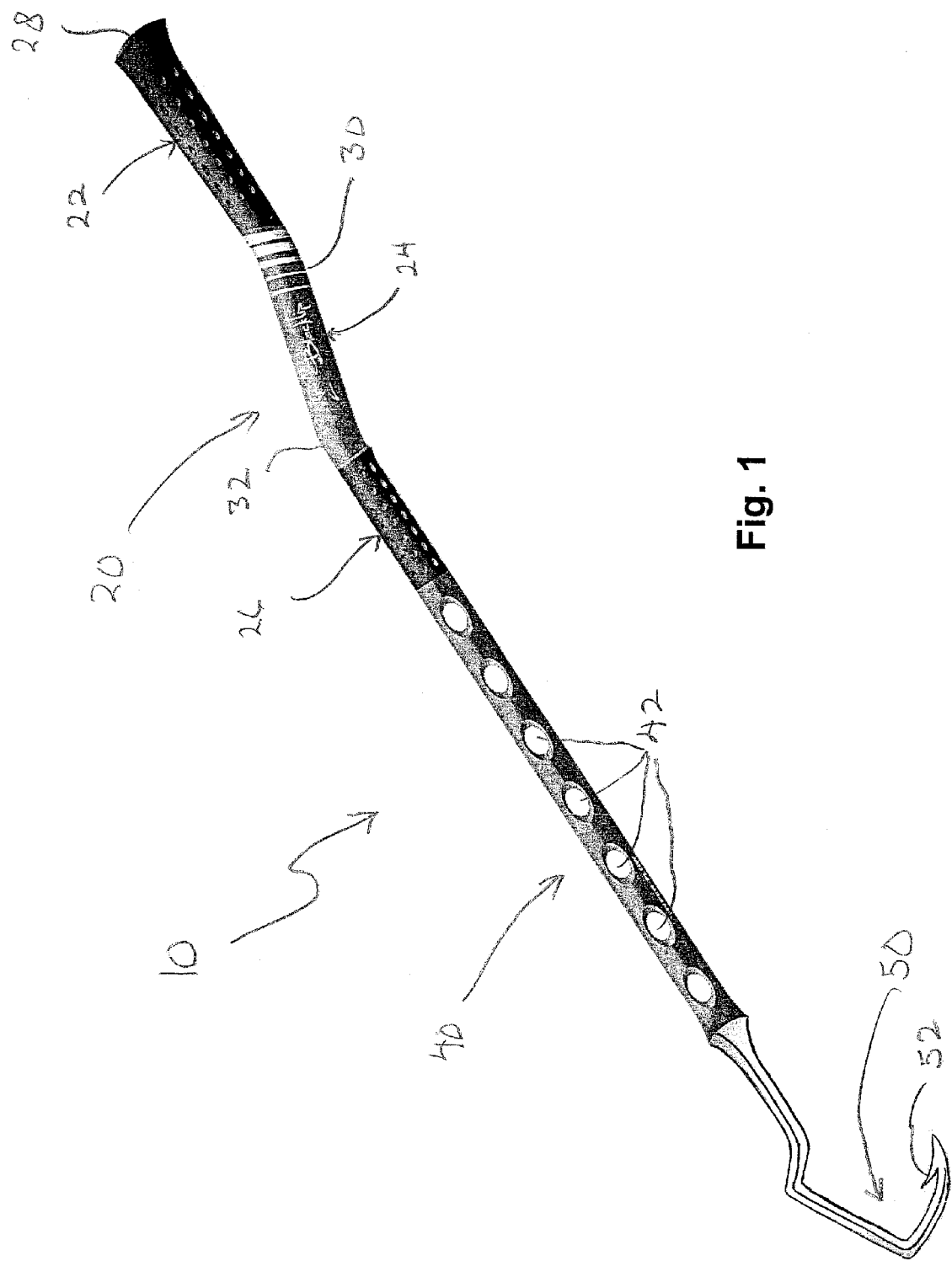
FIG. 1 is a perspective view of a fishing gaff.

With reference to the drawings wherein like numerals represent like parts throughout the several Figures, a fishing gaff is designated generally by the numeral 10. The fishing gaff is employed to engage a large fish and to land the fish or hoist the fish into a watercraft. The fishing gaff 10 has a very efficient construction which is especially adapted to facilitate the landing of relatively large and/or difficult-to-handle fish.

The fishing gaff 10 generally has a unitized support structure which is principally formed by extruding an aluminum workpiece, bending a portion to form an ergonomic gripping structure and finishing the workpiece, as will be further described. The exterior surface partially includes an overmold material and is partially anodized, as will be further described.

The fishing gaff 10 comprises an ergonomic handle 20, an elongated shaft 40 and terminates in a gaff hook 50. The principal structural components thereof are preferably integrally joined and formed from a single extruded aluminum component.

The handle 20 has a first tapered grip portion 22, an intermediate transition portion 24 and an offset second grip portion 26. The first grip portion 22 gradually tapers from a proximal end 28. The handle includes a compound bend formed at bends 30 and 32 between the grip portions 22 and 26. The compound bend results in a handle ergo-dynamically configured to facilitate the usage and leverage of the gaff for large and/or difficult-to-land fish. Each grip portion 22 and 26 is configured and positioned to be gripped by a hand of the user. The spacing of the transition portion 24 provides a distance for advantageously exerting leverage between the user's two hands.

Figure 4:
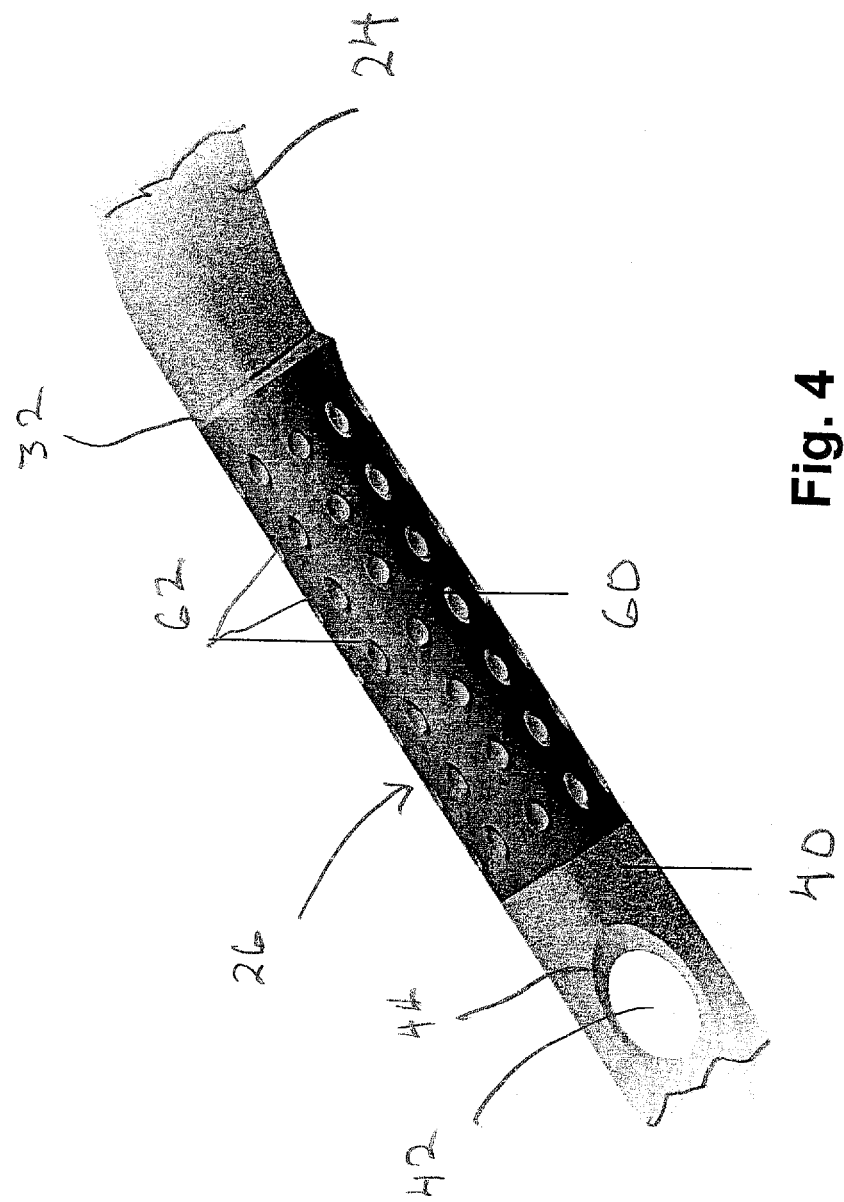
FIG. 4 is an enlarged perspective view of a portion of a handle and a shaft of the fishing gaff of FIG. 1.

With reference to FIG. 4, the exterior surface of the handle grip portions includes a thermosetting overmold 60 which is traversed with various topological surface features such as elliptical indentations 62 to provide an enhanced grip. The compound bend at bends 30 and 32 provides an angular relationship which allows the user's hands to maintain a more natural position and more effectively apply leverage to engage the gaff hook into a fish. In addition, the tapered geometry of the first grip portion 22 facilitates the handling and general control of the gaff.

Figure 5:
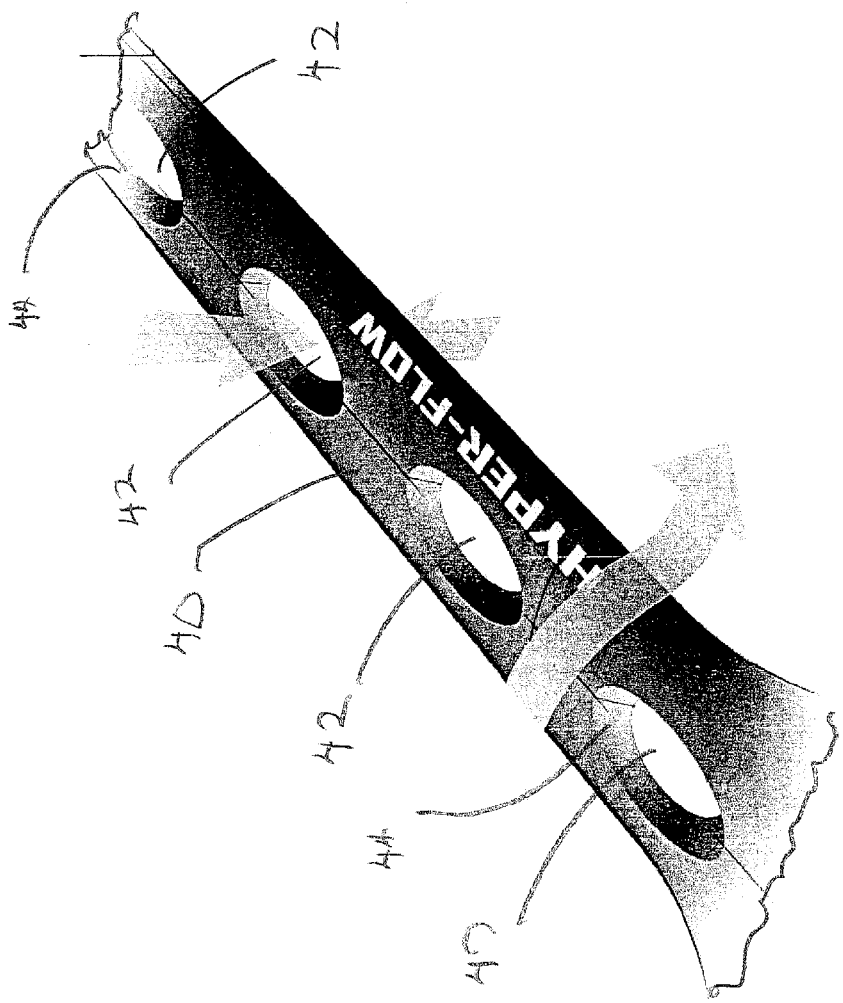
FIG. 5 is an enlarged perspective view, partly in diagram form, of a shaft portion of the fishing gaff of FIG. 1.
Figure 6:
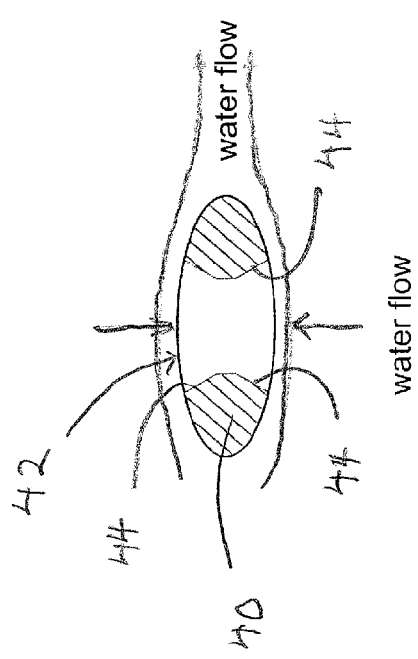
FIG. 6 is an enlarged sectional view, partly in diagram form, of a shaft portion of the fishing gaff of FIG. 1.

The shaft 40 integrally connects and is generally coaxial with the second grip portion 26. The shaft 40 of the fishing gaff has a generally uniform longitudinally extending cross-section traversed by substantially elliptical openings 42 which extend transversely through the shaft. The shaft 40 preferably has a generally elliptical section (except for the openings 42). The elliptical section allows the water to flow around the shaft in a fluid dynamic fashion with less resistance compared to a comparably dimensioned circular section when moving the gaff through the water. The elliptical openings 42 have a slight inward taper 44 and allow water to flow relatively smoothly through the shaft to thereby create improved maneuverability and less fluid resistance. The water flow features are diagrammatically illustrated in FIGS. 5 and 6.

In one preferred form of the fishing gaff, there are seven equally spaced, substantially identically shaped elliptical openings 42 aligned along the shaft 40. The shaft 40 preferably has a black anodized finish.

Figures 2, 3:
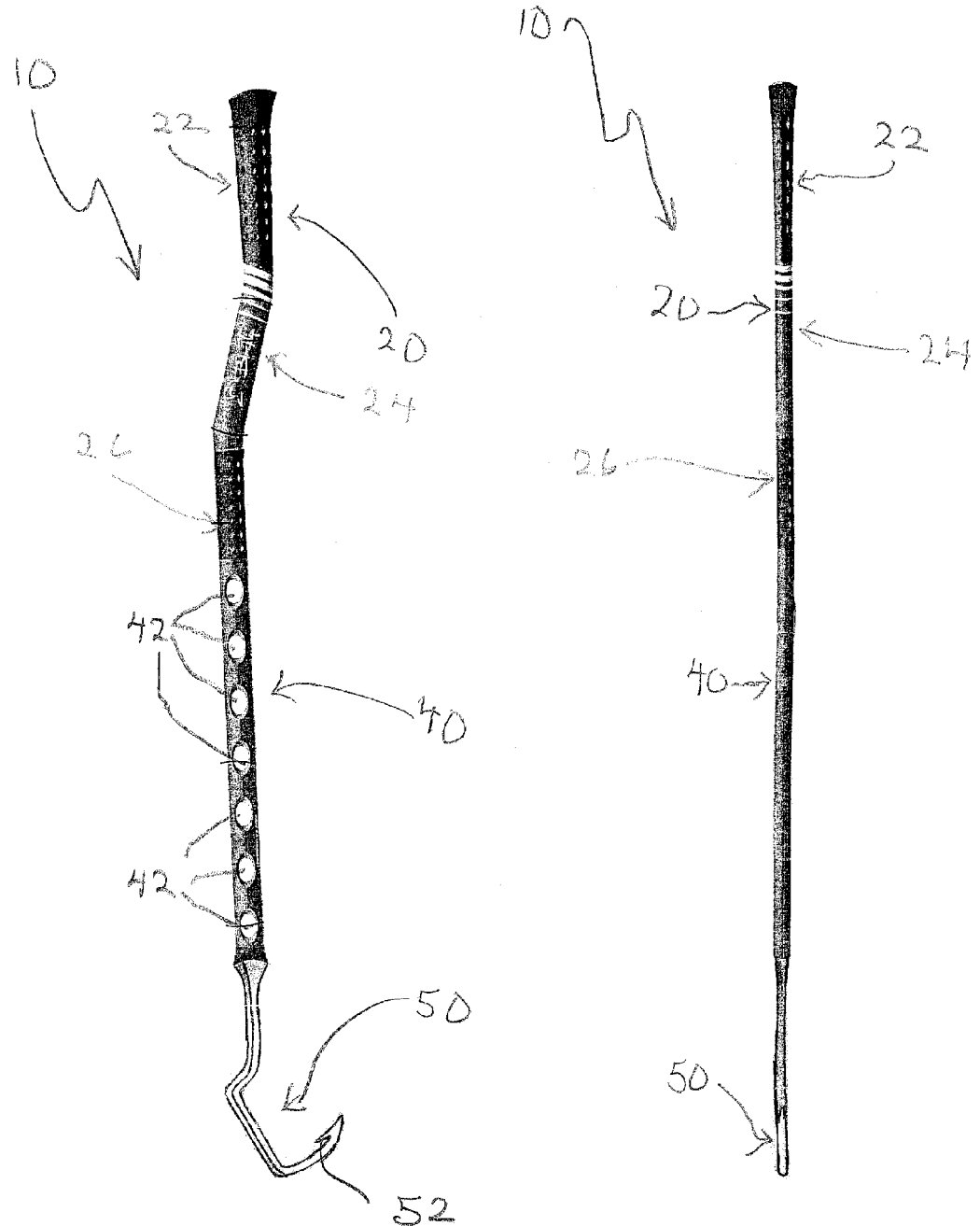
FIG. 2 is a side view of the fishing gaff of FIG. 1.
FIG. 3 is a right side view of the fishing gaff of FIG. 2.

The shaft 40 terminates in an integral hook 50 which is preferably shaped after the extruded process to form bends and a terminal barb 52, as illustrated in FIGS. 1 and 2.

It should be appreciated that the foregoing fishing gaff 10 has a highly efficient structure which is especially adapted for effective use with relatively large and/or difficult-to-land fish.

The invention claimed is:

1. A fishing gaff comprising:
    a handle having a tapered portion and defining an intermediate compound bend;
    a shaft longitudinally extending from said handle, said shaft defining a plurality of longitudinally spaced transverse openings; and
    a hook extending from said shaft.

2. The gaff of claim 1 wherein said openings have a generally elliptical shape.

3. The gaff of claim 2 wherein said openings are equidistantly spaced.

4. The gaff of claim 3 wherein said openings are inwardly tapered.

5. The gaff of claim 1 wherein said shaft has a generally elliptically shaped cross-section.

6. The gaff of claim 1 further comprising an overmold material affixed along at least a portion of said handle.

7. The gaff of claim 1 wherein said handle has two spaced offset grip portions.

8. A fishing gaff comprising:
    a handle having a first generally linear segment, a second generally linear segment and a third generally linear segment, said second segment intersecting said first segment and said third segment to define a compound bend;
    a shaft longitudinally extending from said third segment, said shaft defining a plurality of longitudinally spaced transverse openings; and
    a hook extending from said shaft.

9. The gaff of claim of 8 wherein said openings are equidistantly spaced.

10. The gaff of claim 9 wherein said openings are inwardly tapered.

11. The gaff of claim 8 wherein said shaft has a generally elliptically shaped cross-section.

12. The gaff of claim 8 further comprising an overmould material affixed along at least a portion of said first segment and said third segment.

13. The gaff of claim 12 wherein said first segment and said third segment are disposed in offset relationship.

14. The gaff of claim 8 wherein said first segment has a generally tapered configuration extending from a proximal end to a bend.

15. The gaff of claim 8 wherein there are seven openings which each have a generally elliptical shape.

16. A fishing gaff comprising:
    a handle with an intermediate compound bend which forms a proximal grip segment and a second offset grip segment;
    a shaft integrally longitudinally extending from said second segment, said shaft defining a plurality of longitudinally spaced openings; and
    a hook extending from said shaft.

17. A gaff of claim 16 wherein said handle, said shaft and said hook define a common plane.

18. The gaff of claim 17 wherein said openings are disposed generally orthogonal to said plane.

19. The gaff of claim 16 wherein said openings define corresponding passages having a generally identical shape and dimension.

20. The gaff of claim 16 wherein said proximal grip segment and said offset grip segment each have an overmould covering.

* * * * *